(12) United States Patent
Böck et al.

(10) Patent No.: US 6,427,576 B1
(45) Date of Patent: Aug. 6, 2002

(54) DISPLAY DEVICE

(75) Inventors: Jürgen Böck, Yokohama (JP); Matthias Langko, Stuttgart (DE); Frank Hauber, Wernau (DE); Karl Orszulik, Esslingen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/719,765

(22) PCT Filed: Mar. 27, 2000

(86) PCT No.: PCT/EP00/02679
§ 371 (c)(1),
(2), (4) Date: Dec. 14, 2000

(87) PCT Pub. No.: WO00/68579
PCT Pub. Date: Nov. 16, 2000

(30) Foreign Application Priority Data

May 8, 1999 (DE) .......................... 199 21 474

(51) Int. Cl.⁷ .............................. F01B 31/12
(52) U.S. Cl. ........................................ 92/5 R
(58) Field of Search ................... 92/5 R; 91/1

(56) References Cited

FOREIGN PATENT DOCUMENTS

| DE | 37 04 469 A1 | 9/1987 |
|----|--------------|--------|
| DE | 89 09 155.8  | 11/1989 |
| EP | 0 824 196 A1 | 2/1998 |

OTHER PUBLICATIONS

Patent Abstract of Japan, Publication No. 02248708, Apr. 10, 1990.

*Primary Examiner*—F. Daniel Lopez
*Assistant Examiner*—Michael Leslie
(74) *Attorney, Agent, or Firm*—Hoffmann & Baron, LLP

(57) ABSTRACT

A display means (27) rendering possible the display of an operational relevant for a drive device (1). It comprises a display element (29), which is, or is able to be, mounted in a manner extending about at least 180 degrees of the periphery of the housing (2) of the drive device (1) on the housing and which emits light while in its display state associated with the housing periphery in a distributed manner over the associated periphery of the housing.

22 Claims, 3 Drawing Sheets

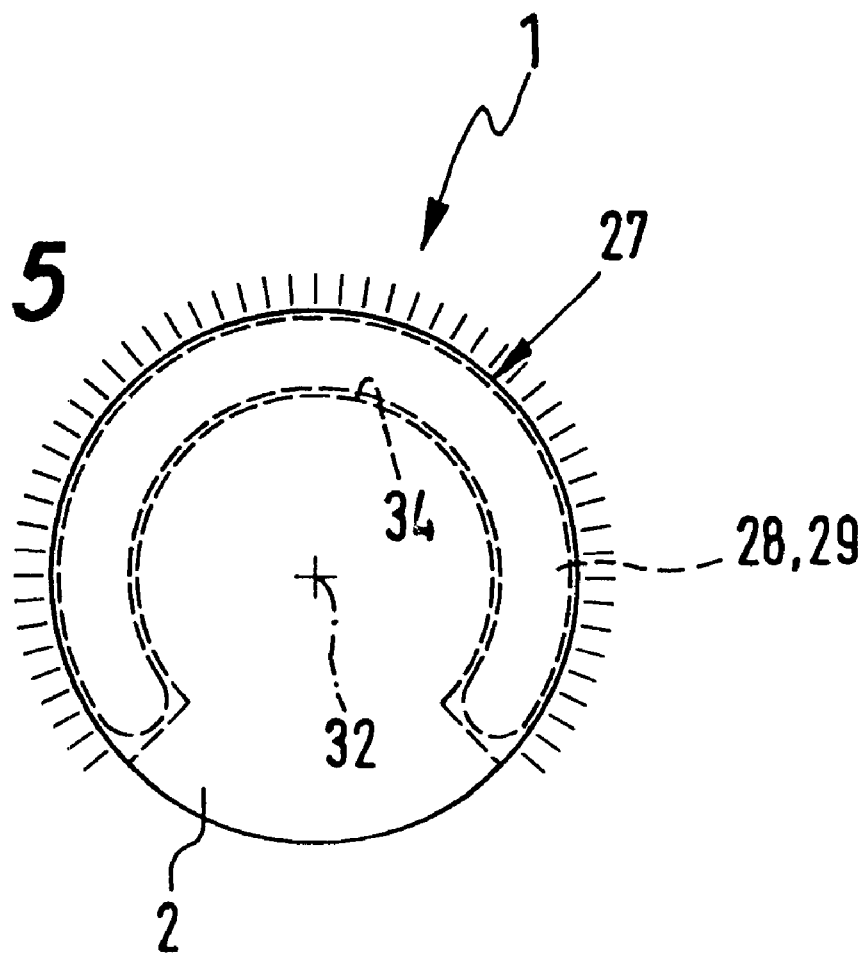

DISPLAY DEVICE

FIELD OF THE INVENTION

The invention relates to a display means for the optical display of a state of operation relevant for a drive device, such drive device having drive part adapted to move in a housing.

BACKGROUND OF THE INVENTION

In the fluid power drive art, as for example fluid power cylinders or other linear drives, there is Frequently the problem of detecting or finding the relative position between the drive part moved by the fluid force and the housing by the use of a sensor means. Such sensor means may for instance be in the form of a proximity switch as sold by the applicant with the type designation SME-8-K-LED-230. This sensor is provided with a display in the form of a light emitting diode, which indicates the state of switching because it turns on when the proximity switch is operated.

Such a display means suffers from the disadvantage that if the drive installed facing in the wrong direction where it is employed the display will not be readily visible or not visible at all. This means that visual inspection of the state of operation of the drive device will be less convenient.

OBJECTS AND SUMMARY OF THE INVENTION

One object of the present invention to provide a display means of the type initially mentioned, which facilitates monitoring at least one operational state relevant for a drive device, more especially in the case of applications involving difficulties in fitting.

In order to achieve this aim a display device is proposed which is equipped with a display element which is, or is able to be, mounted in a manner extending about at least 180 degrees of the periphery of the housing of the drive device on the housing and which in the position of use associated with the housing emits light while in its display state in a distributed manner over the associated periphery of the housing.

It is in this manner that visual monitoring of operational states of a drive device becomes possible even in situations in which fitting is awkward and in which the greater part of the housing's periphery is not visible. When it is displaying, that is to say when it is in an active state, the display element emits distributed light over the periphery, occupied by it, of the housing so that the light signal is readily perceived even when the housing is not facing in the best direction for inspection. Furthermore the optical recognition of relevant operational states is not dependent on the position of mounting of a sensor means which may be present for detection of the respective operational state. The display element may extend over at least 180 degrees of the periphery of the associated housing. It is however possible to provide a design in the form of a closed annulus or loop able to entail encircling the full periphery of a housing.

Further advantageous developments of the invention are defined in the dependent claims.

It is an advantage if the display element is arranged in a receiving recess in the housing radially open to the outside. It is in this manner that it is possible, if necessary, to provide for protection against mechanical damage, such protection being optimum when the display element is completely let into such a receiving recess. It is possible in this case for the outer radial face of the display element to be generally flush with the adjacent outer faces of the housing. A certain outward convexity may be advantageous in order to render reliable reading of the display means possible even when looking in the axial direction. If it is a question of a display annulus it is best anchored in an annular recess.

More particularly when it is a question of a drive device in the form of an electrical and/or fluid power linear drive having at least one terminal cover and an adjoining tubular body containing the drive part, it is an advantage for the display element to be placed between these two components. In this respect the display element may be multi-functional and at the same time able to perform the function of a seal, which connects the two components together in a fluid-tight fashion. This means that it is normally unnecessary to adopt additional sealing measures.

It is convenient for the display element to have a body with at least partially and preferably completely light transmitting properties, it preferably consisting of plastic material. This display body may be provided with one or more light emitting means such as for instance light emitting diodes, which for example constitute punctuate sources of light, and owing to the respective light conducting properties of the display body such light shines outward with a distribution along the entire length thereof.

The display element is preferably provided with a suitable interface, via which supply of the signal causing the emission of light is possible. In this respect it can be a question of an electrical interface, by way of which the electrical actuating signals are supplied, such signals leading to the emission of light energy from integrated light emitting means. It would also be feasible to have a design employing optical interfaces, by way of which the signals, already in the in the form of light, could be fed to the display element.

In keeping with a convenient form of the invention the display element can be designed annularly and in the form of a display annulus, which in the position of use may extend over the full periphery of the associated housing. This means that taking a reading from the display is optimum. If the drive device is a linear drive in an elongated form, the display annulus is preferably installed coaxially to the housing so that readings may be taken reliably on each part of the outer periphery of the housing.

The annular shape of the display element may be designed taking into account the design features of the associated drive device. Accordingly not only circularly annular shapes but also for example oval or polygonal ones are possible.

In the following the invention will be described in detail with reference to the accompanying drawings.

BRIEF DESCRIPTION OF THE DRAWINGS

FIG. 5 shows a further embodiment of the display means in a diagrammatic manner of representation corresponding to that of FIG. 3.

DETAILED DESCRIPTION OF THE PREFERRED EMBODIMENTS

Figure 1:
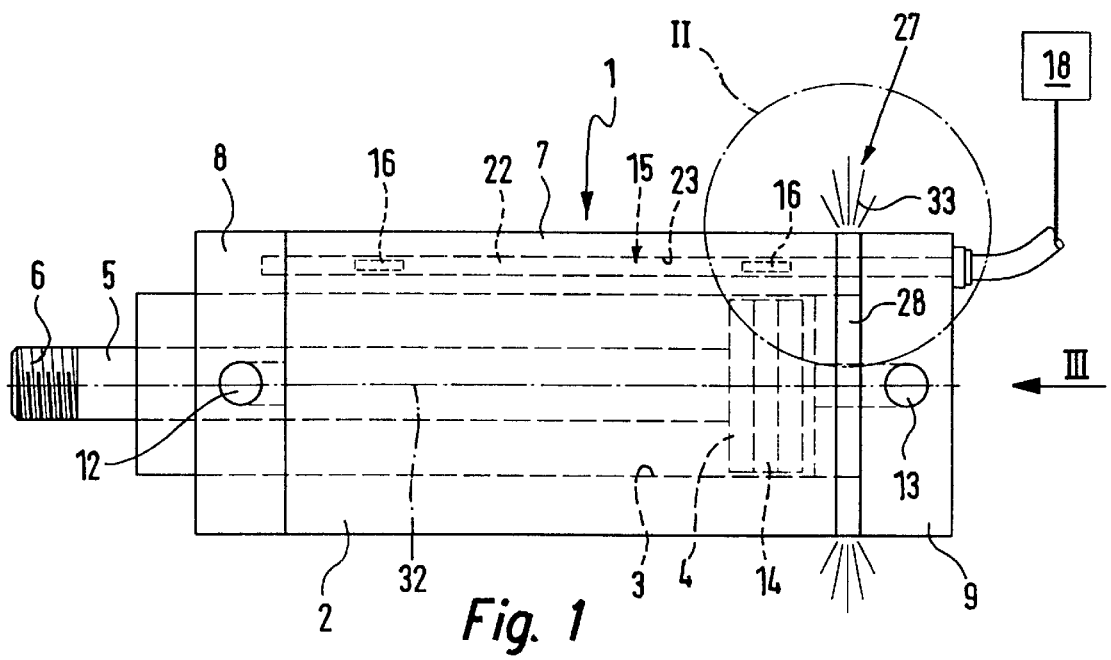
FIG. 1 is a side elevation of an example of a drive device, which has a preferred geometry of the display means in accordance with the invention.

The individual figures each indicate a drive device generally referenced 1, which may be employed to shift or position any desired objects, as for instance components of machines. In the case of the illustrated drive device 1 it is a question of a linear drive operated by fluid power and in the form of a pneumatic power cylinder.

The invention may however be applied to other types of drive devices, for instance in connection with electrically or hydraulically operated linear drives.

The drive device 1 of the example comprises an elongated housing 2, which defines a cylindrical inner space 3, wherein a drive part 4, which performs the function of a piston, is arranged for axial motion.

An actuating element 5, which is kinematically coupled with the drive part 4, extends through the wall of the housing 2 in a sealing fashion and on a portion thereof placed outside the housing 2 has suitable attachment means 6, to which the object to be shifted may be joined.

As regards details, the housing 2 comprises a tubular body 7, on whose two ends a respective cover 8 and 9 is fixed. The present actuating element 5, here in the form of a piston rod, extends through the front cover 8, although a different design would be possible in which a continuous piston rod would extend right through both covers 8 and 9.

The drive part 4 divides up the inner space 3 axially into two working spaces, which each communicates with its own fluid ducts 12 and 13 extending the housing 2, through which ducts the supply or removal of a fluid pressure medium is possible in order to cause the drive part 4 including the actuating element 5 to move linearly in the one or the other direction.

The drive part 4 is provided with an activating member 14, which is in a position of operating a sensor means 15, which is arranged outside the inner space 3, without making contact. In the working embodiments illustrated this sensor means 15 comprises at least one and preferably, in the working examples, at least two magnetic field responsive sensors 16, which are placed within the stroke of the activating member 14 at a minimum radial distance from the activating member 14. The activating member 14 is in the present case in the form of a permanent magnet, whose magnetic field activates the sensors 16, when the drive part 4 is generally at the same level as the respective sensor 16.

On activation the sensors 16 produce signals, which by way of an electrical conductor 17 can be supplied to an integrated or external control means 18 in order to control the drive device 1 in a manner dependent thereon.

Figure 2:
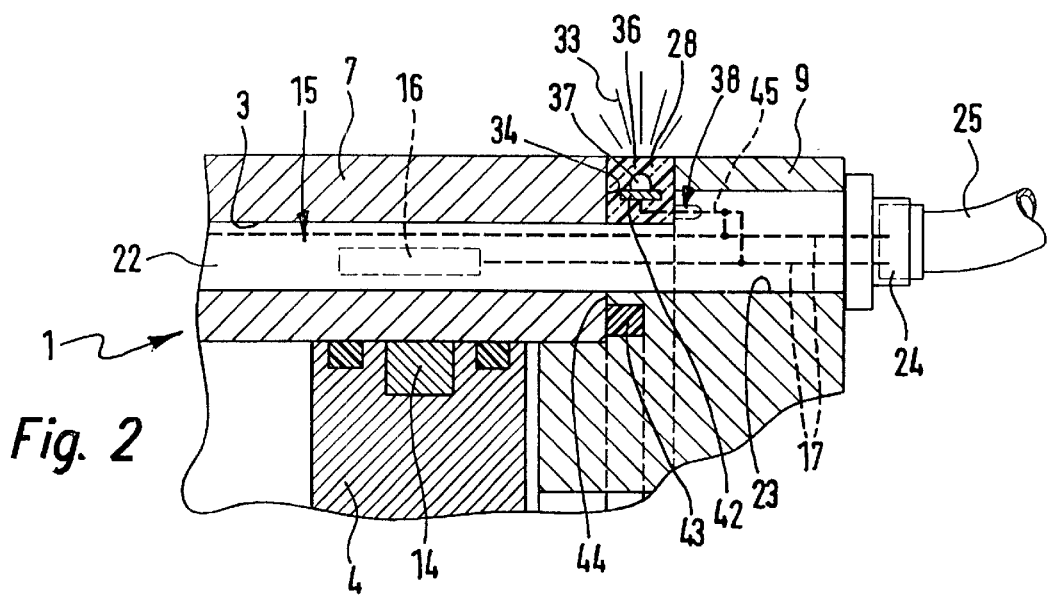
FIG. 2 shows the portion II as marked in FIG. 1 on a larger scale and partly in longitudinal section.
Figure 3:
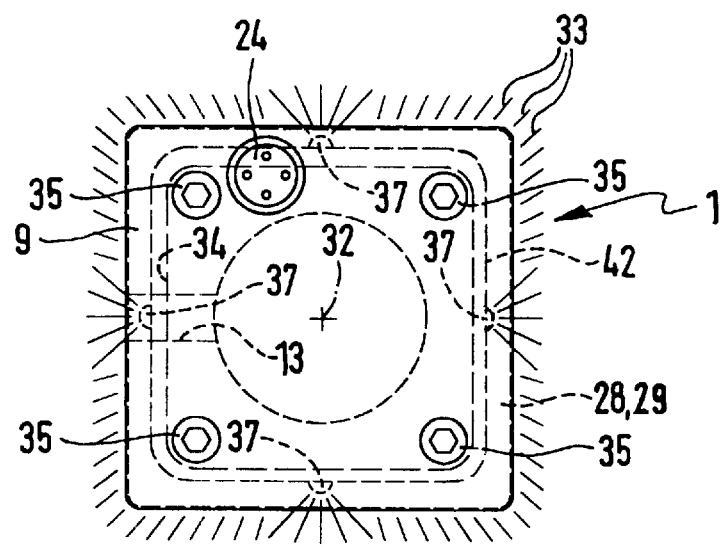
FIG. 3 shows the arrangement of FIG. 1 in an end-on view looking as indicated by the arrow III.

In the working embodiment illustrated in FIGS. 1 through 3 the sensor means 15 includes a rod- or bar-like sensor carrier 22, which coming from the rear terminal face of the housing 2 is plugged into a longitudinal recess 23 with a complementary cross section, such recess extending in the wall of the housing 2 alongside, and parallel to, the inner space 3. The sensors 16 are conveniently accommodated in the interior of the sensor carrier 22, the electrical conductors 17 connected therewith leading to an electrical connection means 24 provided at the outer end of the sensor carrier 22 so that an electric cable 25 leading to the control means 18, may be connected with the connection means 24.

Figure 4:
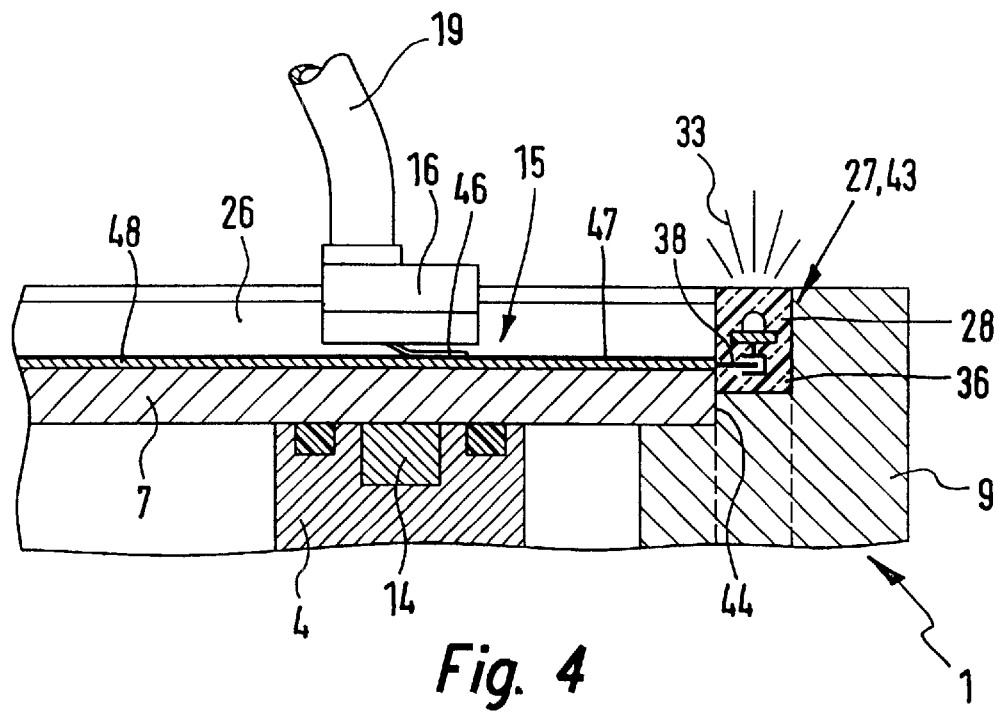
FIG. 4 shows a further embodiment of the display means in a manner of representation similar to that of FIG. 2.

In the working embodiment illustrated in FIG. 4 the sensors 16 are anchored in a receiving recess 26 let into the outer periphery of the housing 2 and extending in the longitudinal direction of the housing 2. Their connection with a control means, not illustrated, may in this case for example be by way of cables 19 extending directly from the respective sensor 16.

All drive devices 1 have their own associated display means 27, which renders possible an optical display or indication of the condition of switching of the sensor means 15. The design is such that the display means 27 emits a light signal every time a sensor 16 a responds, such signal indicating to the observer that the drive part 4 has reached a predetermined relative position in relation to the housing 2. As a rule the sensor means 15 will be employed to detect at least one and preferably both terminal positions of the drive part 4.

In the working examples of the invention there is only one display means 27. However it will be clear that a multiple arrangement would be possible. Thus more particularly each individual sensor 16 could have its own associated display means 27 so that the observer could clearly see which sensor 16 has responded when a display means 27 is turned on.

Furthermore it is to be pointed out that the display means could naturally indicate other operational states as well, which are relevant for the drive part 1. Furthermore the type of sensors responding to a certain operational state may vary so that for instance the switching state of pressure sensors or mechanically responding sensors may be indicated.

As its principal component the display means 27 comprises a display element 29, which is fixed in relation to the housing so that it completely or partly encircles the housing 2, a coaxial arrangement being preferred in connection with an elongated housing 2, as may be well seen from FIGS. 1, 3 and 5. The center of the display element 29 coincides with the longitudinal axis 32 of the housing 2 in this case.

The display element 29 is so designed that it emits light over the part of the periphery, along which it extends, of the housing 2, when it is in the display state. Such a display state occurs in the embodiment when the sensor means 15 responds.

The light signals of the display element 29, which in the drawing are indicated by reference numeral 33, may be readily seen by an observer, irrespectively which particular part of the periphery of the housing 2 is seen by him. The consequence of this is that during fitting of the drive device 1 no special attention need be paid to the mounting of the display means 27. Even in the case of installation of the drive device 1 where there is little space it is therefore always possible to monitor the operational state without difficulty.

The display element could for instance be mounted radially or axially externally on the housing 2. It could also be integrated in the housing 2, more particularly in such a manner as to project radially therefrom some distance. The embodiments of the invention shows a preferred design, in the case of which the display element is completely integrated in the housing 2 so that its outer face, which faces radially outward, extends generally flush with the adjacent outer faces of the housing 2.

In the case of the embodiments of FIGS. 1 through 4 the display element 29 is designed in the form of unbroken display annulus 28, which extends along the entire periphery of the associated housing 2. However an unbroken or complete annular is not absolutely essential. It has been found that a display element whose length is so selected that it just extends over a peripheral angle of at least 180 degrees about the housing's periphery can be read extremely conveniently to see the operational state. Such a geometry is illustrated in FIG. 5, in which the display element possesses an arcuate shape. The length of the arc may for instance be in a range of approximately 270 degrees so that it is possible to speak of a display annulus interrupted at one point on the periphery.

The following further account is on the basis of a display element designed as a complete, unbroken display annulus 28 while nevertheless applying for all other shapes.

In the working embodiment illustrated the housing 2 has a radially outwardly open receiving recess 34, which is arranged concentrically to the housing 2. In order to ensure that the display annulus 28 may be fitted without any problems, the receiving recess 34 in the working example is constituted by an intermediate space between the rear cover 9 and the tubular body 7, into which the display annulus 28 can be inserted when the cover 9 is removed. The cover 9 is for this purpose connected in a detachable manner with the tubular body 7 by screws 35 or some other fastening means. If the display element 29 is in an incomplete or interrupted annular form, it is possible for the receiving recess 34 to have a form, as shown in FIG. 5, whose length is suitably reduced.

It will be clear that the display annulus 28 can be installed between the front cover and the tubular body 7. It is more especially convenient to have a design in which two display annuli are present, which are provided respectively for one of the two covers 8 and 9 and for instance may serve to indicate the respectively associated terminal position of the drive part 4 optically.

Moreover it is possible for display annuli 28 to be provided at some other suitable point on the housing 2 in the required number. Furthermore it would be possible to place at least one display annulus 28 at the front and/or rear end on the housing 2.

The display annulus 28 employed in the working examples has an annular display body 36 which is light transmitting at least partially and preferably totally, it being possible to use a plastic material which is colored in accordance with needs. A plurality of light emitting means, more particularly in the form of LED's are distributed in this display body 36 in the longitudinal direction, i.e. about the periphery. They are surrounded and encapsulated by the material of the 36 preferably completely. Via a suitable electrical interface 38, which may be designed in the form of a plug connection means, all light emitting means 37 are connected electrically either directly or by way of the control means 18 with the sensor means 15 or, respectively, its individual sensors 16 electrically. If a sensor 16 responds, the light emitting means 37 will receive a corresponding signal which causes them to emit light so that the display annulus is in the display state. Preferably the display body 36 possesses such light conducting properties that even in the case of there being a small number of light emitting means 37 a lighting effect is produced shining along the entire periphery, as is indicated in FIG. 3. It will be clear however that in case of need it is possible to have recourse to a single light emitting means 37 in the form of a light emitting band, which extends over the full length of the display body, as measured in the peripheral direction of the housing 2, of the display body 36.

The light emitting means 37 is fixed in the display body 36 of the embodiment and is also simultaneously electrically connected with the interface 38 by being mounted on a printed circuit board 42, which will have a preferably annular form, given an annular form of the display element 29, and be embedded concentrically in the display body 36. The interface 38 is preferably located on an axial side of the display body 36.

The light energy could also as an alternative be supplied to the display annulus 28 via light guides. In this case the interface 38, if present, could be in the form of an optical interface. In the case of such a design it would be possible to dispense with electrically operated light emitting means within the display body 36.

As a rule the display annulus 28 will have pure display function, this also rendering it possible to systematically select the material of the display annulus 36 so that desired optical properties are present. It would however be certainly possible as well to integrate a sealing function in the display annulus 28 as is the case with the embodiment of FIG. 4. In this case the display annulus 28 simultaneously performs the function of an annular seal 43, which is placed between the cover 9 and the tubular body 7 in order to make the connection between the latter two housing components fluid-tight. In this case it is preferred to select a material for the display body 36 which possesses adequate sealing properties, as for instance an elastomeric material. By way of abutment means 44 effective between the two housing components 7 and 9 it is possible to prevent the display annulus 28 from being crushed in the receiving recess 34.

In the embodiment illustrated in FIGS. 1 through 3 separate sealing ring 43, which placed between the cover 9 and the tubular body 7.

In the working embodiment illustrated in FIGS. 1 through 3 the display annulus 28 is connected via its interface 38 preferably directly with the sensor carrier 22, within which by way of leads 45 an electrical connection with the electrical leads 17 may be produced, such leads 17 running to the sensors 16.

FIG. 4 shows a modified design in the case of which the sensors 16 are in electrical contact by way of contacts 46, more particularly in the form of wiper contacts, with one or more printed wiring elements 47, such printed elements extending along the holding recess 26 an d being connected by way of the interface 38 with the light emitting means 37 of the display annulus 28. The printed wiring elements 47 may be directly integrated in the housing 2 or may be located for instance on a printed circuit board 48, which is fixed in relation to the housing and which is more especially located in the interior of the holding recess 26.

FIG. 3 will serve to make it clear that the display annulus does not necessarily have a circularly annular shape. Its geometry may be adapted more particularly to the outer form of the housing 2 of the drive device 1. To agree in shape with the square cross sectional form of the housing in the working embodiment the display annulus 28 will here have a correspondingly polygonal ring-like form following the periphery of a square. The corner portions could be radiussed.

What is claimed is:

1. A display means for the optical display of a state of operation relevant for a drive device, said drive device having a drive part adapted to move in a housing, characterized by a display device which is adapted to be mounted in a manner extending at least 180 degrees of the periphery of the housing of the drive device on the housing and which in the position of use associated with the housing emits light while in its display state in a distributed manner over the associated periphery of the housing.

2. The display means as set forth in claim 1, characterized in that the operational state to be indicated is the condition of switching of a sensor means (15) of the drive device (1).

3. The display means as set forth in claim 1, characterized in that the drive device (1) is an electrically and/or fluid power driven linear drive, as for instance a fluid operated power cylinder.

4. The display means as set forth in claim 1, characterized in that in the condition placed on the housing of the drive device (1) the display element (29) is arranged coaxially to the housing (2).

5. The display means as set forth in claim 1, characterized in that the display element is arranged in a receiving recess in the housing, said recess being radially open toward the outside.

6. The display means as set forth in claim 5, characterized in that the receiving recess (34) is constituted by an intermediate space defined between two components (7 and 9) of the housing (2).

7. The display means as set forth in claim 6, characterized in that the two components are a tubular body (7) and a cover (9), arranged thereon, of the housing (2).

8. The display means as set forth in claim 1, characterized in that the display element comprises a display body having at least partially light transmitting and/or light conducting properties, said body being provided with at least one light emitting means.

9. The display means as set forth in claim 8, characterized in that at least one light emitting means (37) is embedded in the display body (36).

10. The display means as set forth in claim 8, characterized in that the display body (36) has light transmitting and/or light conducting properties along its entire length.

11. The display means as set forth in claim 8, characterized by a plurality of light emitting means (37) arranged along the length of the display body (36).

12. The display means as set forth in claim 8, characterized in that the at least one light emitting means (37) is provided on a printed circuit board (42) associated with the display body (36).

13. The display means as set forth in claim 12, characterized in that the printed circuit board (42) is designed in the form of a annulus and is arranged concentrically to the display body (36) which is also annular.

14. The display means as set forth in claim 8, characterized in that the display body consists of plastic material.

15. The display means as set forth in claim 1, characterized in that the display device forms a seal effective between two components of the housing.

16. The display means as set forth in claim 1, characterized in that the display device possesses an interface for the supply of a signal causing the emission of light.

17. The display means as set forth in claim 1, characterized in that the display device is coupled with a sensor means associated with the drive device.

18. The display means as set forth in claim 1, characterized in that the display device is so designed that its external radial face extends substantially flush with the adjacent external faces of the housing.

19. The display means as set forth in claim 1, characterized in that the display device is in the form of a display annulus extending in the position of use over the entire periphery of the housing of the drive device.

20. The display means as set forth in claim 19, characterized in that the display annulus (28) is arranged in an annular receiving recess (34) in the housing (2).

21. The display means as set forth in claim 18, characterized in that the display device is designed in the form of a circular annulus.

22. The display means as set forth in claim 18, characterized in that the display device possesses a polygonal annular form.

* * * * *